(12) United States Patent
Prado et al.

(10) Patent No.: US 12,517,937 B1
(45) Date of Patent: Jan. 6, 2026

(54) SEMANTIC SEGMENTATION OF DATA FOR INFORMATION RETRIEVAL

(71) Applicant: Dell Products L.P., Round Rock, TX (US)

(72) Inventors: Adriana Bechara Prado, Niterói (BR); David Burth Kurka, Campinas (BR); Thais Luca Marques de Almeida, São Gonçalo (BR); Rômulo Teixeira de Abreu Pinho, Niterói (BR); Vinicius Michel Gottin, Rio de Janeiro (BR); Werner Spolidoro Freund, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/763,389

(22) Filed: Jul. 3, 2024

(51) Int. Cl.
*G06F 7/00* (2006.01)
*G06F 16/31* (2019.01)
*G06F 16/334* (2025.01)
*G06F 16/35* (2019.01)

(52) U.S. Cl.
CPC ........ *G06F 16/3347* (2019.01); *G06F 16/322* (2019.01); *G06F 16/3344* (2019.01); *G06F 16/35* (2019.01)

(58) Field of Classification Search
CPC .... G06F 16/3347; G06F 16/322; G06F 16/35; G06F 16/3344; G06F 16/783; G06F 16/78; G06F 16/9558; G06F 16/951; G06F 16/93; G06F 40/30; G06F 40/279; G06V 30/416; G06V 20/49
See application file for complete search history.

(56) References Cited

U.S. PATENT DOCUMENTS

| | | | | |
|---|---|---|---|---|
| 2009/0327338 | A1* | 12/2009 | Zhao | G06F 16/9558 |
| 2014/0301644 | A1* | 10/2014 | Koh | G06V 30/416 |
| | | | | 382/175 |
| 2019/0043533 | A1* | 2/2019 | Srinivasan | G06V 20/41 |
| 2022/0358287 | A1* | 11/2022 | Nasukawa | G06F 16/93 |

OTHER PUBLICATIONS

Sebastian Riedel, Douwe Kiela, Patrick Lewis, Aleksandra Piktus, "Retrieval Augmented Generation: Streamlining the creation of intelligent natural language processing models", Sep. 28, 2020. https://ai.meta.com/blog/retrieval-augmented-generation-streamlining-the-creation-of-intelligent-natural-language-processing-models/.

(Continued)

*Primary Examiner* — Mohammad A Sana
(74) *Attorney, Agent, or Firm* — Workman Nydegger

(57) ABSTRACT

The disclosure relates to information retrieval and includes a preprocessing stage and a retrieval stage. The preprocessing stage includes ingesting data in a semantic manner that incorporates domain expert knowledge and that retains contextual information. The ingested data or objects are chunked and chunk embeddings are generated. A knowledge graph is created to hierarchically represent each of the objects. During the retrieval stage, the top k embeddings closest to an embedding of a query are used to identify the semantic cells and metadata cells of a document corresponding to the top k embeddings. This generates a return object that is used an input for content generation.

20 Claims, 7 Drawing Sheets

(56) References Cited

OTHER PUBLICATIONS

Patrick Lewis, Ethan Perez, Aleksandra Piktus, Fabio Petroni, Vladimir Karpukhin, Naman Goyal, Heinrich Küttler, Mike Lewis, Wen-tau Yih, Tim Rocktaschel, Sebastian Riedel, Douwe Kiela, "Retrieval-Augmented Generation for Knowledge-Intensive NLP Tasks", Apr. 12, 2021. https://arxiv.org/abs/2005.11401v4.
Vector database, Wikipedia, 2023. https://en.wikipedia.org/wiki/Vector_database.
Enzo, "Neo4j's Vector Search: Unlocking Deeper Insights for AI-Powered Applications," Graph Database & Analytics. Accessed: Dec. 12, 2023. https://neo4j.com/blog/vector-search-deeper-insights/.
Custom Retriever combining KG Index and VectorStore Index—LlamaIndex • 0.9.14.post1. Accessed: Dec. 12, 2023. https://docs.llamaindex.ai/en/latest/examples/index_structs/knowledge_graph/KnowledgeGraphIndex_vs_VectorStoreIndex_vs_CustomIndex_combined.html.
"Constructing knowledge graphs from text using OpenAI functions: Leveraging knowledge graphs to power LangChain Applications," LangChain Blog. Accessed: Dec. 6, 2023. https://blog.langchain.dev/constructing-knowledge-graphs-from-text-using-openai-functions/.

\* cited by examiner

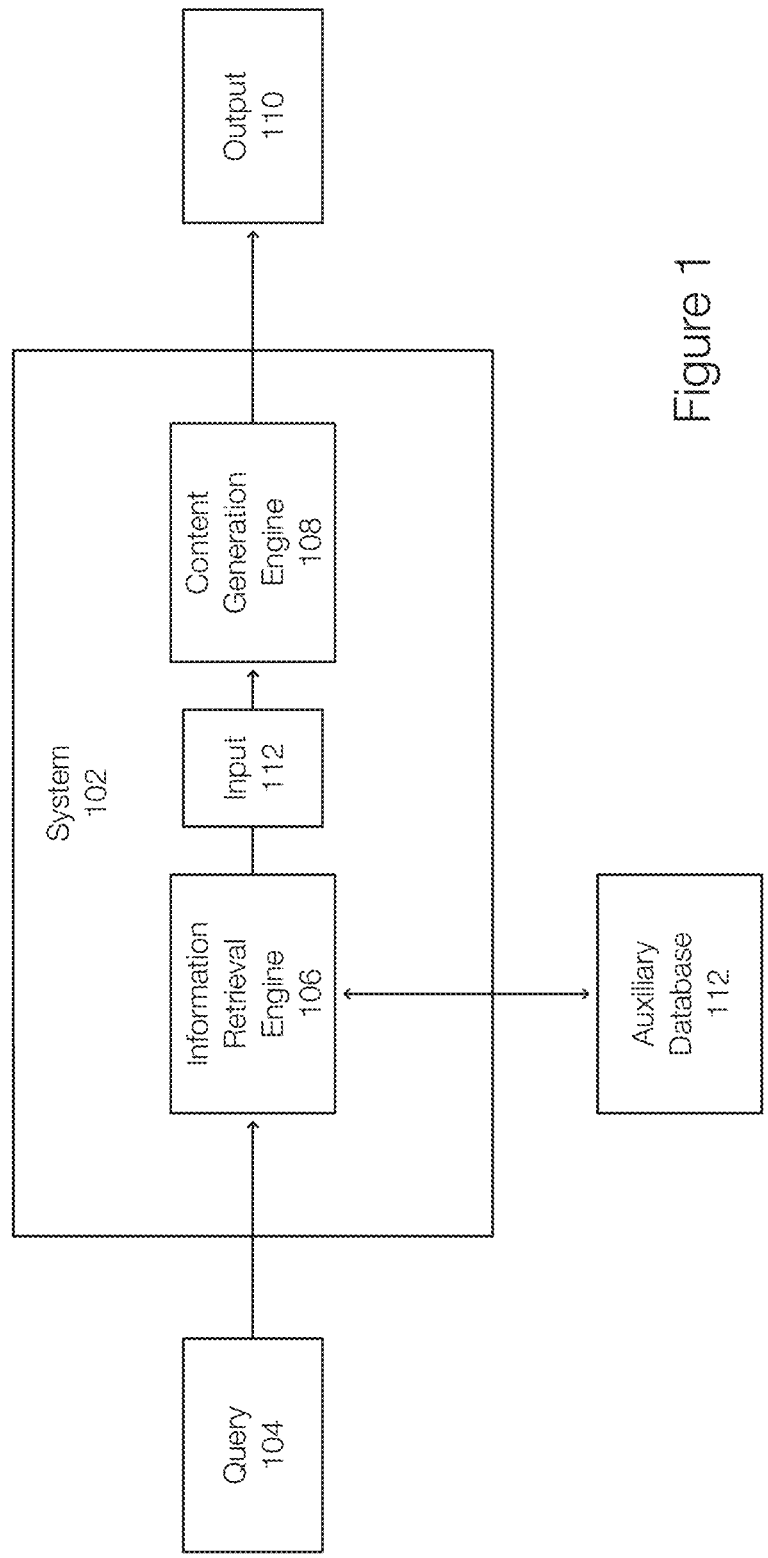

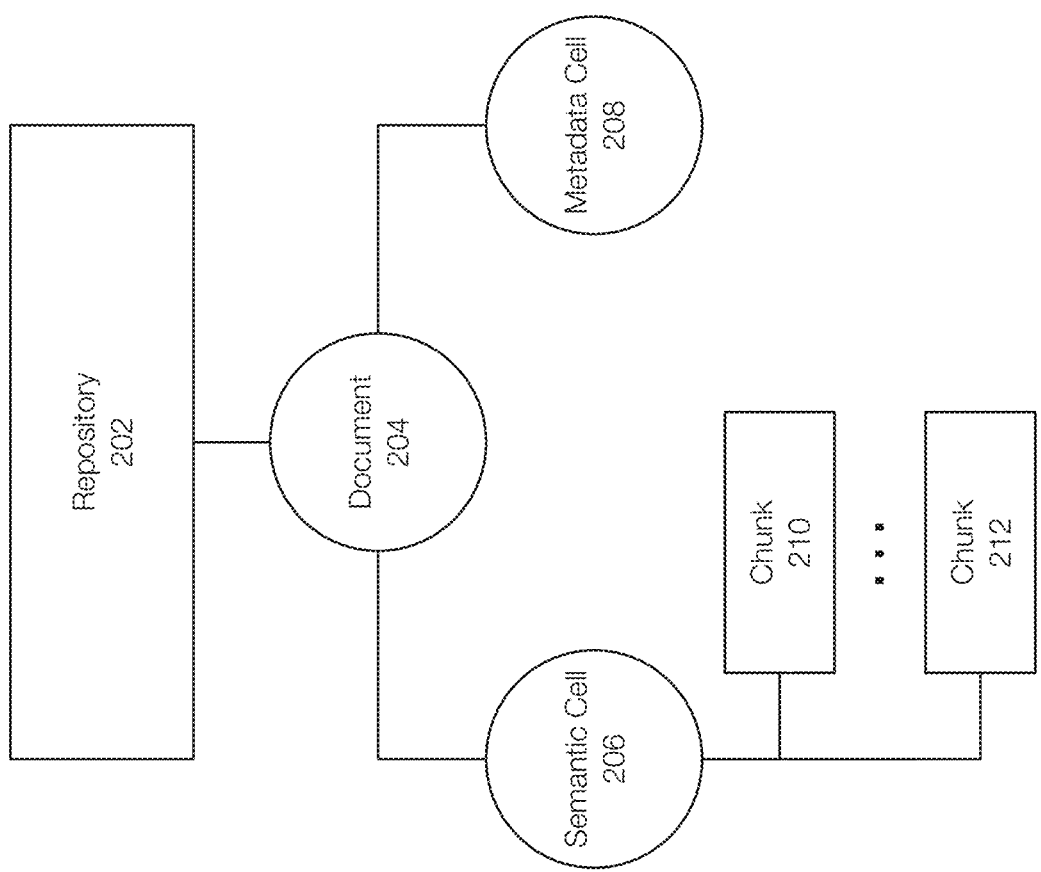

SEMANTIC SEGMENTATION OF DATA FOR INFORMATION RETRIEVAL

TECHNOLOGICAL FIELD OF THE DISCLOSURE

Embodiments disclosed herein generally relate to information retrieval. More particularly, at least some embodiments relate to systems, hardware, software, computer-readable media, and methods for semantically segmenting data for information retrieval including retrieval augmented generation operations.

BACKGROUND

Retrieval augmented generation (RAG), which includes information retrieval and/or content generation, is a process that relates to providing a model, such as a large language model (LLM), with a query and with data that contains the answer or response to the query. The large language model attempts to answer or respond to the query in a manner that does not deviate from the content t provided as input. Conventional retrieval augmented generation implementations may break documents from a set of databases that are to be used to answer or respond to queries into chunks. These chunks are embedded (transformed into vectorial representations) and stored in a vector database. When presented with a query, content closest to the query is identified from the vector database for retrieval. Most solutions directly use the text associated with embeddings stored in vector databases as input to the content generation operation.

Information retrieval and content generation, however, have various shortcomings. For instance, when relying on vector databases, existing data are typically split into chunks and, for each chunk, an indexable embedding is built. This enables, for a given query that is subsequently embedded, direct retrieval of data chunks through proximity comparisons between the query embedding and the data embeddings.

To create practical embeddings of the data, (i.e., embeddings that capture semantics of the data), the underlying data needs to be split into limited sized chunks. However, information (e.g., metadata) regarding the underlying data context is lost for many chunks. For example, a large paragraph of a technical document may be encoded with embeddings or embedded. Because transforming an entire paragraph into a single embedding is not possible, often due to the limitations of encoding models, the paragraph is split into smaller chunks (e.g., individual sentences, or even parts of sentences). Embeddings are then determined or computed for each of these smaller chunks. Because each embedding refers to a part of the paragraph and not to the whole content, context may be lost. More specifically, if a chunk that corresponds to a sentence or a part of a sentence is retrieved during an information retrieval operation, the chunk will be decontextualized. Decontextualized chunks cause issues, such as incorrect or less optimal responses, in the content generation operation.

Another issue related to directly using typical chunked data as information retrieval output (and therefore content generation input), is that any structure such as associated metadata, formatting and hierarchy may also be lost, because the process of splitting data into chunks usually does not incorporate specialist or domain expert knowledge. Rather, the chunking operation simply sequentially divides the source or document into disjoint parts.

In addition, the content retrieved in data chunks may not be properly formatted (e.g., incomplete sentences, unreferenced text). This can cause issues for the large language model used in the content generation operation. Plus, data management operations needed to make sure the data stored and retrieved remain consistent over time while the sources of information are updated are difficult or unavailable.

BRIEF DESCRIPTION OF THE DRAWINGS

In order to describe the manner in which at least some of the advantages and features of one or more embodiments may be obtained, a more particular description of embodiments will be rendered by reference to specific embodiments thereof which are illustrated in the appended drawings. Understanding that these drawings depict only typical embodiments and are not therefore to be considered to be limiting of the scope of this disclosure, embodiments will be described and explained with additional specificity and detail through the use of the accompanying drawings, in which:

FIG. 1 discloses aspects of an application or system configured to perform information retrieval and content generation using semantically segmented objects;

FIG. 2 discloses aspects of a preprocessing stage that may include ingesting documents from a data source to generate a vector database and/or a knowledge graph for use in information retrieval;

DETAILED DESCRIPTION OF SOME EXAMPLE EMBODIMENTS

Figure 3A:
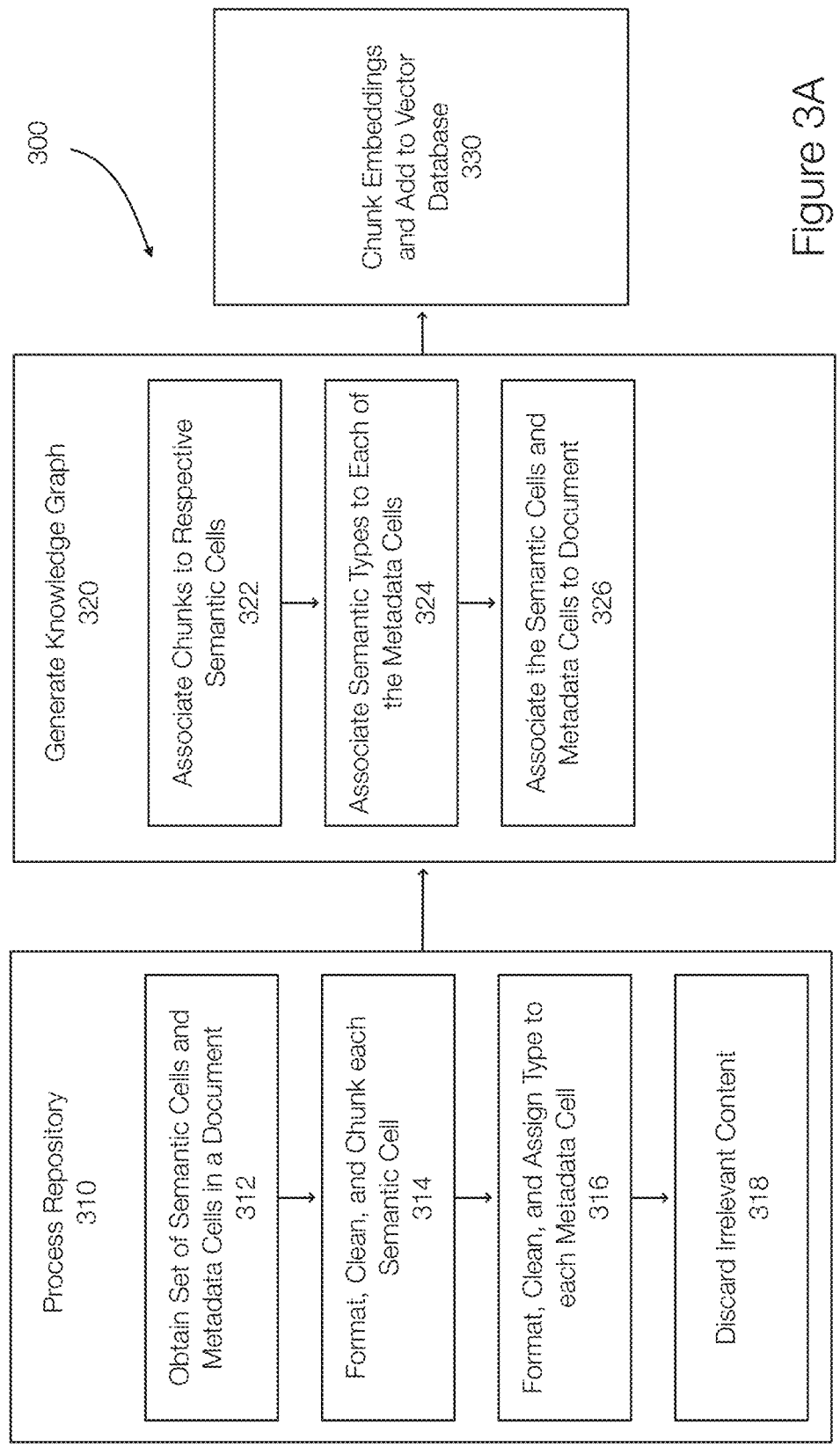
FIG. 3A discloses additional aspects of a preprocessing stage for preparing datasets and knowledge representations for information retrieval.

Embodiments disclosed herein generally relate to semantic segmentation of data for information retrieval or for retrieval augmented generation operations. More particularly, at least some embodiments relate to systems, hardware, software, computer-readable media, and methods for segmenting data for information retrieval and/or content generation operations performed by applications that include machine learning models such as large language models (LLMs).

Large language models are typically trained using very large sets of data. Large language models are able to perform a variety of tasks and are used in various applications such as translation applications, prediction applications, content generation applications, chatbot applications, question/answer applications, and the like.

Retrieval augmented generation (RAG) is an aspect of building large language based systems or applications that may deal, for example, with private and internal data. Retrieval augmented generation combines (a) information retrieval with (b) content generation using large language models. Chatbots, for example, may be configured to answer domain specific questions and perform semantic information searches on custom knowledge databases. Given a query, relevant information is searched and retrieved from indexed databases, and this information is then passed to a large language model (usually via prompting techniques) so that the large language model can generate content based on the retrieved information.

The content generation operation, consequently, depends on the information retrieval operation. Thus, information retrieval operation can impact the success of the overall task and may directly impact the quality/correctness/usefulness of the content generated during the content generation operation.

When developing an application, a dataset may be identified for various purposes including searching purposes. For example, the identified dataset may be searched based on a query. Once the dataset is identified, a data segmentation process and a data indexing strategy are designed and implemented.

Embodiments of the invention relate to improving information retrieval and/or content generations, such as present in retrieval augmented generation systems. More specifically embodiments of the invention relate to organizing and indexing data sources to improve retrieval augmented generation systems by providing improved information retrieval operations that are able to preserve context, exploit and incorporate expert or domain knowledge, and provide composable and dynamic data structures that improve the information retrieval operations, whose output is, in effect, the input for the content generation operation. Embodiments of the invention further support management operations including create, update, and delete operations.

More specifically, embodiments of the invention relate to cleaning, organizing formatting, indexing, selecting, and/or composing data from multiple datasets systematically and in a scalable manner. Embodiments of the invention further relate, by way of example, to structing information retrieval operations in an retrieval augmented generation system.

In contrast with existing retrieval augmented generation implementations, which typically break documents from data sources into chunks, embodiments of the invention relate to a hierarchy where documents are composed of or represented by semantic cells and other metadata. The semantic cells are further split into chunks. Advantageously, the chunks, even when small (e.g., sentences, partial sentences) remain contextualized. This improves the performance of the application.

Embodiments of the invention combine the retrieval of relevant semantic information from a vector database with a rich and traversable knowledge representation (e.g., knowledge graph). The knowledge graph allows an object's (e.g., a document) structure and metadata to be captured and represented in the knowledge graph. This further enables the retrieved data to be meaningfully augmented with metadata (context) when assembling the input to the large language model for content generation.

Aspects of information retrieval may include two stages: (i) a data preprocessing stage where data from datasets is indexed, organized and stored; and (ii) a data retrieval stage, in which data is searched and retrieved. The data preprocessing stage may be performed offline, while the data retrieval stage typically occurs at inference time (online).

Embodiments of the invention are discussed in the context of databases or datasets that include documents. However, embodiments of the invention can generally be implemented with objects of varying types. Thus, a document is an example of an object.

The preprocessing stage includes performing operations to: (i) identify, extract, clean, and/or break documents into semantic cells and to chunk the content of the semantic cells and, and (ii) identify, extract, and clean metadata associated with the documents.

When identifying or generating the semantic cells, nodes may be created in a knowledge graph for each of the semantic cells. Creating nodes includes splitting the content of a semantic cell into chunks. Thus, the semantic cell is represented by a node and the chunks are also represented by nodes that are hierarchically arranged with respect to the node corresponding to the semantic cell.

During this process, the knowledge graph is augmented with the embeddings of the chunks, which may be stored in a vector database. In one example, each chunk is added to the knowledge graph as a node under a node of the respective parent semantic cell. The embedded vectors of the chunks are, in turn, stored in the vector database with a pointer to (or identifier of) their corresponding node in the knowledge graph.

Information retrieval is performed when a query is submitted to the application (e.g., a question or comment in a chatbot window). The query includes or is associated with sematic types. Using the query, semantic types determine which metadata is retrieved from the knowledge graph. In this manner, the context of the chunk can be used to augment the content generation operation and context is not lost or missing.

Next, the query is embedded using the same language model employed for embedding the chunks during the preprocessing (or data ingestion operation). The embedded query vector is submitted to a similarity search mechanism implemented by the vector database. This allows one or more chunks to be identified that are similar to the query. The nodes in the knowledge graph that corresponds to the identified chunks are determined or identified. The semantic types provided with the query may be used to augment the data being retrieved with semantic information and to filter the relevant metadata associated with the document or object from which the chunk was derived.

Embodiments of the invention improve information retrieval operations (e.g., RAG) using semantic cells, which allows semantic content to be arbitrarily modeled by decoupling its frontiers from both embedding modelling choices and document structural elements. This also enables the addition or insertion of domain specific and expert knowledge to a dataset in a scalable manner.

The semantic cells allow rich processing pipelines to be created that are able to clean, format and categorize data from different sources according to the specifications of the semantic cells. Embodiments of the invention introduce a composable structure for data sources that can be customized for different and flexible content generation tasks using semantic cells, metadata cells, and semantic tags. Data management operations support the consistency of the information retrieval operations.

FIG. 1 discloses aspects of an application or system configured to perform information retrieval and content generation. A system 102 (or an application) may include an information retrieval engine 106 and a content generation engine 108. The information retrieval engine 106 and the content generation engine 108 may rely on one or more large language models. The system 102 may operate on or include a computing system configured to interact with clients that may be remote from the system 102.

For example, the system 102 may be part of a chatbot application implemented to aid internal operations of a company or to answer customer queries. In this example, the information retrieval engine 106 may receive a query 104 from a client (or a user operating a client system). The information retrieval engine 106 may use the query 104 to retrieve content from an auxiliary database 112 that has been prepared as discussed herein. More specifically, the auxiliary database 112 may refer to a vector database and/or a knowledge graph.

The information retrieval engine 106 identifies and retrieves information or data. The system 102 then generates an input 112 to the content generation engine 108 that includes or is based on the retrieved information or data. The content generation engine 108 generates an output 110 that may be provided to the user (e.g., displayed on a display to a user) in one example. In the context of a chatbot application, the output 110 may be an answer or response to the query 104 and may be constructed from data stored in and retrieved from the auxiliary database 112 by the information retrieval engine.

Part of information retrieval includes preprocessing operations (or data ingestion operations). This generally relates to preparing the documents (e.g., objects or data) such that specific data from the documents can be identified and retrieved in response to a query. Embodiments of the invention relate to preprocessing operations that capture semantic and structural information of source documents such that more relevant information, compared to conventional retrieval strategies, can be retrieved. This is accomplished using a traversable knowledge graph that allows retrieved content or data to be augmented and remain contextualized when assembling an input to a content generation operation.

FIG. 2 discloses aspects ingesting documents from a data source (e.g., a repository, a dataset, database). FIG. 2 illustrates a repository 202 of documents that includes the document 204. The documents stored in the repository 202 may be similar (e.g., similar structure, format).

A single document may include multiple semantic cells. In one example, a semantic cell is a content container. The semantic containers may be sized to be sufficiently small while having semantically valuable information related to the document. Each of the semantic cells is, in one example, a content container.

In a generic document, for example, each of the fields may represent a semantic cell. In a deck of slides, the semantic cells may be individual slides. In one the example, the exact grain may be defined by a domain expert and may change according to the type of the document. Thus, expert knowledge can be incorporated into the data ingestion or preprocessing stage. In this example, the document 204 is associated with a semantic cell 206. Content of the semantic cell 206 may be divided or chunked into chunks represented by chunks 210, 212.

A metadata cell 208 (or multiple metadata cells) may also be associated with the document 204. The metadata cell 208 may include auxiliary content that may describe the document 204. The content of the metadata cell 208 may also be defined by a domain expert or extracted from data structures that compose the document 204. For example, creation date, people associated with the creation of a form, status information, or the like, may each be represented by a metadata cell.

Some metadata content, such as the metadata cell 208, may be structured as a node and contain relationships to other knowledge graph entities such as the semantic cell 206. These details may facilitate writing graph queries. In this example, however, all metadata content is represented in a single graph entity such as the metadata cell 208.

Rather than breaking documents from data sources into chunks, embodiments of the invention implement a hierarchy where documents such as the document 204 are composed of or divided into semantical cells such as the semantic cell 206 and other metadata such as the metadata cell 208. The sematic cells are then broken or chunked into chunks. The inclusion of semantic cells, by way of example, allows smaller chunks to retain contextual information.

The size of a semantic cell may be determined from empirical observations. Information retrieval, for example, typically performs better when concise information is identified as input to the content generation operation. In one example, the input generated or identify by the information retrieval information should contain all the data that pertains to the query, but nothing more. Semantic cells satisfy this constraint because they are a self-contained representation of the chunks associated with them. In addition, the semantic cells also carry domain-expertise in terms of the semantics they represent within the document.

Generally, the preprocessing stage or data ingestion stage is configured to process the documents available from one or more data sources or repositories. The ingested and prepared data is stored in auxiliary databases for information retrieval operations. The preprocessing stage thus includes processing the documents stored in the data sources and ingesting the resulting data into auxiliary databases, and generating the knowledge graph.

In one example, a collection $C=\{S_1, S_2, \ldots, S_m\}$ of m data sources $S_i$ (repositories) are selected or identified. Each data source $S_j=\{D_1, D_2, \ldots, D_n\}$ contains a collection of n documents $D_i$ that share a common structure, format and/or type of content.

For each data source $S_j \in C$, a processing function $f_{s_j}$, is obtained or identified. The processing function defines adequate processing for all documents in the corresponding data source. Different processing functions may be used for different data sources. The processing function can process the documents in a given repository due to their similarity in structure.

As the data sources are processed, a knowledge graph is created. The knowledge graph associates the data sources and their documents to their extracted contents (e.g., the chunks) and metadata. Once the chunks are extracted or identified, embeddings for chunks of semantic cells are computed and related to a vector database. Information retrieval is performed using an auxiliary database, which may include a vector database and/or a knowledge graph.

FIG. 3A discloses aspects of a preprocessing stage for preparing datasets and knowledge representations for information retrieval operations. In one example, a method 300 includes processing 310 a repository. The repository or data source may include documents (more generally objects). When processing 310 selected or identified repositories, all documents from the repositories are processed and the resulting data (e.g., embeddings, knowledge graph) is ingested into auxiliary databases (e.g., the auxiliary database 112) for information retrieval operations.

As previously stated, all documents in a particular data source are expected to share a common structure, format, and type of content. This commonality, along with domain expert knowledge, allows embodiments of the invention to identify, extract, clean and organize the content of the documents of that data source into semantic cells. The semantic cells relate to chunks that are embedded in a vector database for later data information retrieval, and metadata cells, that describe the document itself.

The identification aspect of the preprocessing stage may depend on or may rely on domain expertise. For example, for a data source that includes HTML forms, experts may indicate the fields of the HTML forms that are the most relevant for the types of questions the large language model is supposed to answer (for example, Description, Conclusion, etc.) Domain experts may also indicate which fields may be used to augment the answers to the query in the form of metadata.

More specifically, processing 310 the repository includes obtaining or creating a set of semantic cells and metadata cells for a document. For example, assuming all documents (objects) in $S_i$ are of the same type (for example, the HTML forms above), $f_{s_i}$ (the processing function) extracts semantic cells, $SC_k$, metadata cells, $MC_l$, from each document, and discards other data as irrelevant.

More specifically, a set of semantic cells and metadata cells of a document are obtained 312 by splitting $D_i$ in distinct parts (cells) and labelling the parts as pertaining to a semantic cell, a metadata cell, or as irrelevant content. This allows a set Sc of all semantic cells in the document and a set Mc of all metadata cells in the document to be obtained or determined.

Next, each semantic cell of a document is formatted, cleaned, and chunked 314. More specifically, for each Semantic Cell $Sc_k \in Sc$, its content is formatted and cleaned and the cleaned content is split into chunks $Ch=Ch_0, Ch_1, \ldots$. Each metadata cell is also formatted, cleaned, and assigned at least one type 316. Irrelevant content may be discarded 318.

The result of extraction by the processing function $f_{s_i}(D_i)$ may be represented as a tuple (Sc, Mc), where Sc is a list of semantic cells, each including a sequence of chunks and where Mc is a list of metadata cells, each associating a value to a known type—for example, "John Doe" to the type "author".

Each semantic and metadata cell pair may have its own processing function accordingly to their semantic type, which formats and cleans $Sc_k$'s content accordingly and splits the content into chunks. A formatting example may be to convert HTML content into raw text, and a cleaning example may be to remove irregular characters or irrelevant parts of the content.

Splitting content into chunks, in one example, may include breaking raw text into pieces with the same number of characters. Such pieces may or may not overlap. As a general rule, however, sizes and overlaps can be adjusted such that at least a couple of chunks are generated for each of the semantic cells Metadata cells are similarly formatted and cleaned. Specific functions that depend on their nature may be used if necessary. In addition, pre-defined types may be assigned to each piece of metadata.

Once all of the documents in a data source are processed 310, the knowledge graph may be generated 320. More specifically, metadata are inserted into a database that contains the structure of a knowledge graph hierarchy. Chunks, semantic cells, and metadata are eventually stored in the knowledge graph.

For example, given a repository or data source $S_i$ and a document $D_j \in S_i$ for processing, semantic and metadata cells are first identified and extracted. A data structure (for example, a dictionary) may be created to contain the relevant information from the document (for example, the parent repository, some identifier, authorship, creation/update dates, status, the list of identified semantic cells and their contents, etc.).

More specifically, generating 320 the knowledge graph includes associating 322 chunks to their respective semantic cells. More specifically, generating 320 the knowledge graph includes associating chunks Ch to their respective semantic cell $Sc_k \in Sc$. Next, semantic types are associated 324 to each of the metadata cells. More specifically, semantic types St are associated to each of the metadata cells $Mc_k \in Mc$. Then, the semantic cells and metadata cells are associated 326 to the document. Rather, the semantic cells Sc and the metadata cells Mc are associated to their respective document D.

Figure 3B:
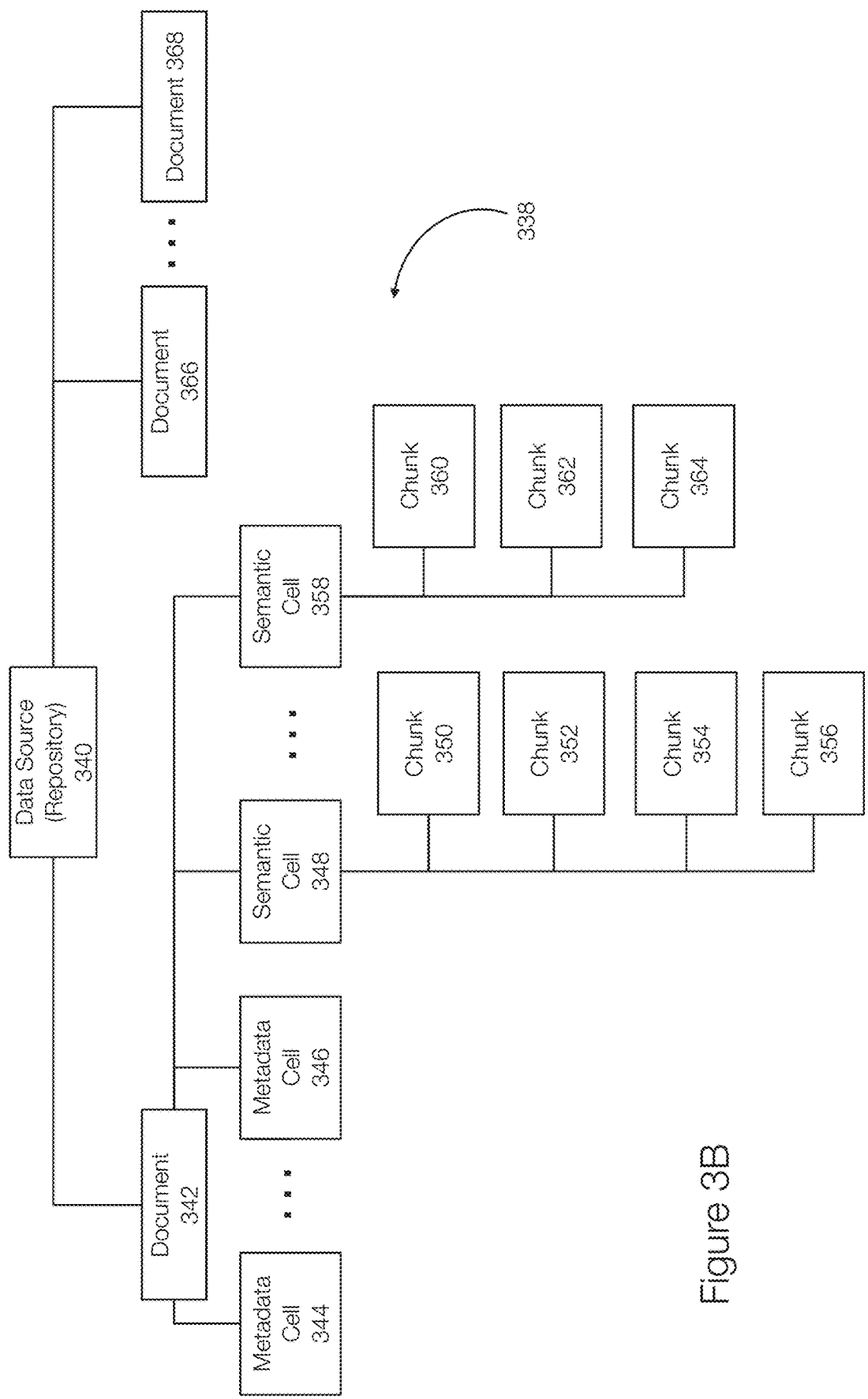
FIG. 3B discloses aspects of a knowledge graph generated during the preprocessing or data ingestion stage.

FIG. 3B discloses aspects of a knowledge graph generated during the preprocessing or data ingestion stage. The knowledge graph 338 includes nodes that represent various aspects of the data being preprocessed or ingested. For instance, a node (data source 340) is added as a root of the hierarchy of the knowledge graph 338. Next, a node corresponding to an object (document 342 from the data source 340) is added. The document 342 points to the data source 340. Next, all nodes that correspond to metadata (e.g., the metadata cells 344 . . . 346) of the document 342 are added to the knowledge graph 338 as nodes in a hierarchical manner. The semantic cells (or their content), represented by nodes for the semantic cells 348 and 358 of the document 342 are chunked and added as nodes. Thus, the chunks 350, 352, 354, and 356 are represented as nodes and correspond to portions of the content of the semantic cell 348. The nodes representing the chunks 360, 362, and 364 are associated with the node representing the semantic cell 358. Other objects (documents 366 and 368) from the data source 340 are similarly processed to generate the knowledge graph 338. The nodes may be representations (e.g., identifiers, pointers) or may contain actual data from the document.

Figure 4:
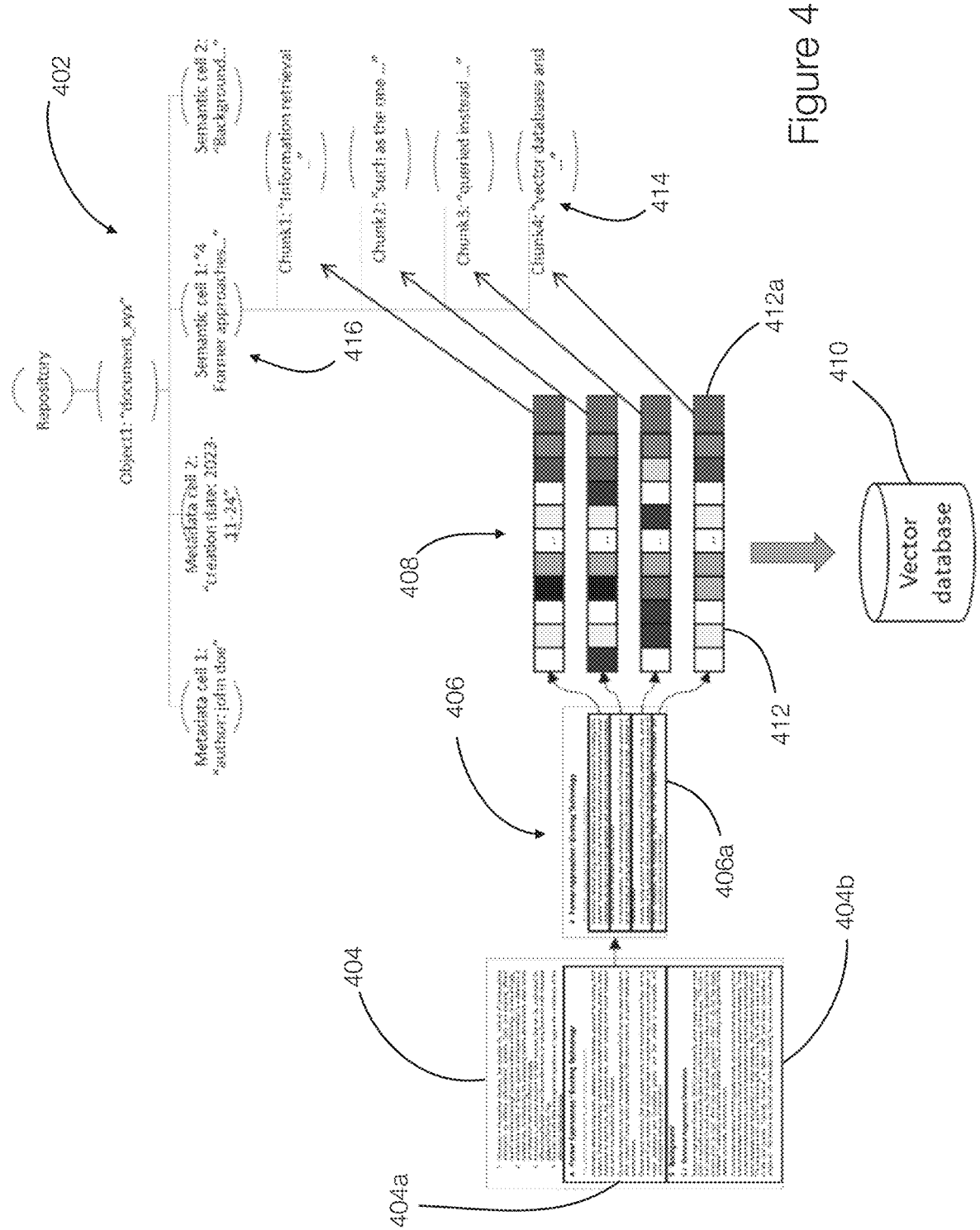
FIG. 4 discloses aspects of storing chunk embeddings in a vector database and relating the chunk embeddings to a knowledge graph.

FIG. 4 discloses aspects of storing chunk embeddings in a vector database and relating the chunk embeddings to a knowledge graph. FIG. 4 illustrates a document 404, which is associated with a data source or repository. When preprocessing the document 404, expert domain knowledge may be used to identify semantic cells. In this example, the document 404 includes semantic cells 404a and 404b.

The semantic cells may be chunked. Thus, the content of each of the semantic cells 404a and 404b are divided or chunked into chunks. For example, the semantic cell 404a is chunked or divided into smaller chunks 406.

In one example, a large language model may be used to generate chunk embeddings 408 (or chunk vectors). A chunk embedding, in one example, is a vectorial representation of a chunk. Thus, the embedding or vector 412 corresponds to the chunk 406a. A pointer 412a is appended to the vector 412 and points to a node 414 in the knowledge graph 402. Thus, the node 414 is configured to represent the chunk 406a. The pointer 412a could alternatively point to a node 416 for a semantic cell, which may allow chunk nodes to be eliminated from the knowledge graph 402. As previously stated, chunks are often decontextualized.

Embodiments of the invention allow chunks, including smaller chunks (e.g., sentences, partial sentences) to retain contextualization. The knowledge graph allows the contextualization (e.g., the metadata cells) to be associated with semantic cells and thus with each of the chunks associated with the semantic cells. Thus, FIG. 4 illustrates that small chunks can be associated with nodes in a knowledge graph such that context is not lost for smaller chunks. The semantic cells and metadata cells are associated with chunks and information from these cells can be used to augment information retrieval and/or content generation.

As illustrated in FIG. 4, creating nodes in the knowledge graph includes splitting the content of the semantic cells. Thus, the contents of the semantic cell 404a is split into chunks 406. The knowledge graph 402 is augmented with the embeddings of the chunks, which are stored in the vector database 410, which stores the embeddings or vectors 408. The vector database 410 may be considered to be part of the knowledge graph 402 in one embodiment. An auxiliary database may include the vector database 410 and/or the knowledge graph 402.

Thus, the vectors 408 or embeddings of the chunks 406 are stored in the vector database 410 along with a pointer or identifier of their corresponding node in the knowledge graph 402.

After the pre-processing or data ingestion operations, the databases (data source database, vector database, knowledge graph, etc.) related to the preprocessing stage are interconnected. Over time, the documents (or objects) in the data source database may be changed (e.g., updated, deleted, replaced). For example, a document may be updated with new content and/or metadata. Embodiments of the invention ensure that these changes are reflected in the knowledge graph and vector database such that information retrieval remains consistent.

For example, when a document is changed, all chunks related to the changed document are deleted in the vector database. New chunks are created and stored in the vector database. Similarly, the hierarchy portion in the knowledge graph for the changed document is deleted and recreated. Thus, changes to a document in a repository or data source are accompanied with updates as necessary based on the change to the vector database and/or knowledge graph. These changes may propagate automatically and may be triggered by a change to a document.

Figure 5:
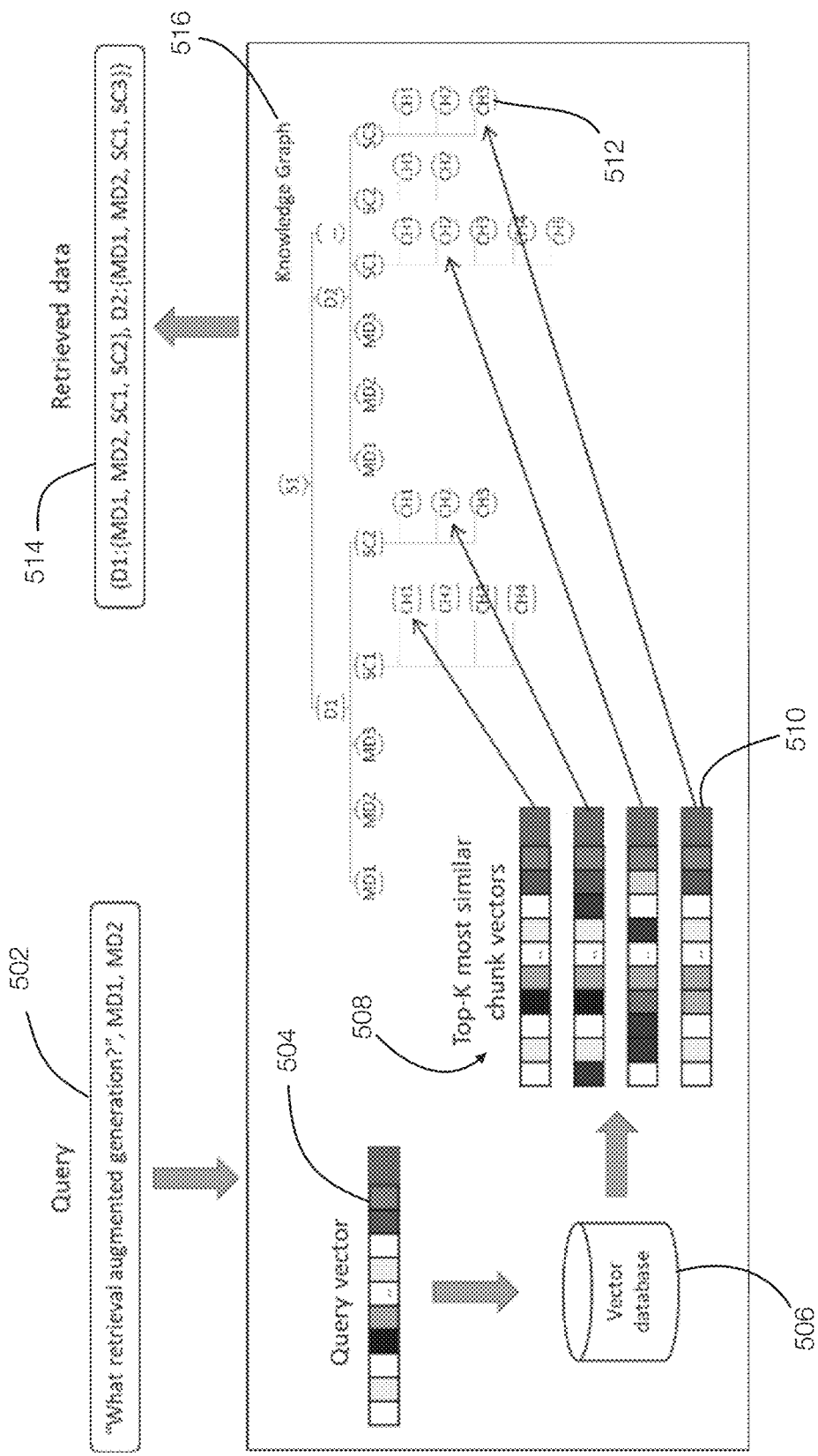
FIG. 5 discloses aspects of information retrieval based on auxiliary databases generated or configured during a pre-processing or data ingestion stage.

FIG. 5 discloses aspects of information retrieval based on auxiliary databases generated or configured during a preprocessing or data ingestion stage. In FIG. 5, the preprocessing stage for documents is completed. Thus, the auxiliary database (e.g., a vector database 506 and a knowledge graph 516 have been prepared for the information retrieval stage.

In the information retrieval stage, a query 502 is received. The query 502 may include semantic types that determine types of metadata to be retrieved from the knowledge graph.

The retrieval process is initiated once the query 502 is received. Generally, a query embedding or vector 504 is generated from the query. In other words, the query 502 is embedded. The vector database 506 is searched using the embedded query 504 to find the most similar vectors 508 in the vector database 506. For each of the embeddings (or chunks) identified from the vector database 506, the corresponding chunk (or node) in the knowledge graph is identified (e.g., using a pointer such as the pointer 510). Once the chunk node is identified, the semantic cell associated to the chunk is retrieved or identified. Metadata cells associated to the document are also obtained. The metadata cells may be filtered based on the semantic type included in the query 502. A return object or retrieved data 514 is then returned. The retrieved data or return object includes or identifies the semantic cells, metadata cells, and the document.

The retrieved data 514, which includes data for each of the chunks 508 identified from searching the vector database 506, is formatted as input to a large language model used in content generation. This allows contextualized chunks to be provided as input to the large language model and improves the content generation operation.

More specifically, the information retrieval process includes the following steps or acts. A query 502 Q that includes or is associated with a set of target semantic types $ST_q$ is received at the application. The query vector 504 is then generated. Thus, $E_q$, the embedding of Q, is computed with the same language model used to compute the embeddings E of the data chunks in the preprocessing stage previously discussed.

The vector database 506 is searched to find or identify the k embeddings $E_d$ with the smallest distance to $E_q$. For each $E \in E_d$, the chunk $Ch_j$ associated to E in the vector database is obtained. $Ch_j$ in the knowledge graph is located and the semantic cell $Sc_k$ associated to $Ch_j$ is obtained. The document $D_i$ associated to the semantic cell $Sc_k$ and metadata cells Mc associated to the document $D_i$ are also obtained. Mc' ⊂ Mc is obtained by filtering the metadata cells whose semantic type St is one of the target semantic types, that is, St ∈STq.

Once this is performed, a return object (514) O=($Sc_k$, Mc', $D_i$) is returned. All return objects O with similar $D_i$ are merged.

As a result, a set of data or output (the retrieved data 514) is returned by this information retrieval operation. The retrieved data 514 contains information that can be used by a function g that formats the retrieved data 514 as input to a large language model in the content generation operation. IN one example, the retrieved data 514 includes content of metadata cells and content of semantic cells (e.g., all chunks related to a semantic cell). However, the retrieved data 514 could include content limited to the chunks identified from searching the vector database using the query.

In this example, for a query that includes metadata types of MD1 and MD2, the retrieved data 514 includes documents D1 and D2, metadata cells from those documents D1 and D2 whose type match the query, and semantic cells (SC1 and SC2 for D1 and SC1 and SC3 for D2) associated with the chunks 508 identified from the database 506.

Embodiments of the invention thus relate to enhanced information retrieval systems and methods, which may be incorporated into, by way of example, retrieval augmented generation systems. Embodiments of the invention incorporate semantic structures and domain expertise into the selection, categorization, and storage of relevant information for the retrieval augmented generation system. Embodiments of the invention further relate to a composable structure for data sources that can be customized for different content generation tasks.

Embodiments, such as the examples disclosed herein, may be beneficial in a variety of respects. For example, and as will be apparent from the present disclosure, one or more embodiments may provide one or more advantageous and unexpected effects, in any combination, some examples of which are set forth below. It should be noted that such effects are neither intended, nor should be construed, to limit the scope of the claims in any way. It should further be noted that nothing herein should be construed as constituting an essential or indispensable element of any embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments disclosed herein, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments. This discussion is not intended to limit the scope of the claims or this disclosure, or the applicability of the embodiments, in any way.

In general, embodiments may be implemented in connection with systems, software, and components, that individually and/or collectively implement, and/or cause the implementation of, preprocessing operations, embedding operations, formatting operations, cleaning operations, vector operations, information retrieval operations, and/or content generation operations. More generally, the scope of this disclosure embraces any operating environment in which the disclosed concepts may be useful.

New and/or modified data collected and/or generated in connection with some embodiments, may be stored in a data storage environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to perform operations initiated by one or more clients or other elements of the operating environment.

Example cloud computing environments, which may or may not be public, include storage environments that may provide data protection functionality for one or more clients. Another example of a cloud computing environment is one in which processing, data storage, data protection, and other, services may be performed on behalf of one or more clients. Some example cloud computing environments in connection with which embodiments may be employed include, but are not limited to, Microsoft Azure, Amazon AWS, Dell EMC Cloud Storage Services, and Google Cloud. More generally however, the scope of this disclosure is not limited to employment of any particular type or implementation of cloud computing environment.

In addition to the cloud environment, the operating environment may also include one or more clients that are capable of collecting, modifying, and creating, data. As such, a particular client or server or other computing system may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data storage system components such as databases, storage servers, storage volumes (LUNs), storage disks, servers and clients, for example, may likewise take the form of software, physical machines, containers, or virtual machines (VMs), though no particular component implementation is required for any embodiment.

As used herein, the term 'data' or 'object' is intended to be broad in scope. Example embodiments are applicable to any system capable of storing and handling various types of objects, in analog, digital, or other form.

It is noted that any operation(s) of any of the methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments. These are presented only by way of example and are not intended to limit the scope of this disclosure or the claims in any way.

Embodiment 1. A method for generating an auxiliary database configured for information retrieval operations, the method comprising: accessing an object stored in a repository of objects, dividing the object into distinct parts, labelling each of the parts as a semantic cell, a metadata cell, or irrelevant, splitting content of each of the semantic cells into chunks, generating chunk embeddings for each of the chunks of each of the semantic cells, and generating a knowledge graph that includes a root node representing the repository, wherein: the object is represented by an object node under the root node, the semantic cells and metadata cells are arranged as semantic nodes and metadata nodes hierarchically under the object node, chunk nodes are created for each of the chunks under corresponding semantic nodes, and each of the chunk embeddings includes a pointer to a corresponding chunk node in the knowledge graph.

Embodiment 2. The method of embodiment 1, wherein the object comprises a document and the repository is a data source of documents.

Embodiment 3. The method of embodiment 1 and/or 2, wherein the knowledge graph includes objects from multiple repositories.

Embodiment 4. The method of embodiment 1, 2, and/or 3, further comprising formatting and cleaning the content of the semantic cells and of the metadata cells.

Embodiment 5. The method of embodiment 1, 2, 3, and/or 4, further comprising assigning a type to each of the metadata cells based on the content of the metadata cells and assigning a semantic type from a collection of possible types to each of the metadata cells.

Embodiment 6. The method of embodiment 1, 2, 3, 4, and/or 5, wherein labelling each of the parts is based on domain expert knowledge.

Embodiment 7. The method of embodiment 1, 2, 3, 4, 5, and/or 6, further comprising storing the chunk embeddings and associated pointers in a vector database.

Embodiment 8. The method of embodiment 1, 2, 3, 4, 5, 6, and/or 7, further comprising generating an auxiliary database that includes the vector database and the knowledge graph.

Embodiment 9. The method of embodiment 1, 2, 3, 4, 5, 6, 7, and/or 8, further comprising performing management operations in the vector database and the knowledge graph when changes occur to objects in the repository, wherein the changes include object additions, object deletions, and/or object modifications.

Embodiment 10. A method for retrieving information from an auxiliary database that includes a vector database and a knowledge graph, the method comprising: receiving a query from a client, wherein the query includes a semantic type, generating a query embedding from the query, searching the vector database with the query embedding to identify a k most similar chunk embeddings to the query embedding, identifying chunks corresponding to the chunk embeddings and their corresponding nodes in the knowledge graph, obtaining semantic cells associated to the identified chunks and an object associated with the semantic cells, obtaining metadata cells associated with the object and identify a set of the metadata cells whose semantic type matches the semantic type included in the query, and returning a return object that includes the object, the semantic cells, and the set of metadata cells.

Embodiment 11. The method of embodiment 10, further comprising formatting the return object as input for content generation.

Embodiment 12. The method of embodiment 10 and/or 11, further comprising performing content generation using the input.

Embodiment 13. The method of embodiment 10, 11, and/or 12, further comprising generating the query vector using a large language model that generated the chunk embeddings.

Embodiment 14. The method of embodiment 10, 11, 12, and/or 13, wherein the return object contextualizes the input.

Embodiment 15. The method of embodiment 10, 11, 12, 13, and/or 14, wherein the semantic cells are based on domain expert knowledge.

Embodiment 16 A system, comprising hardware and/or software, operable to perform any of the operations, methods, or processes, or any portion of any of these, disclosed herein.

Embodiment 17 A non-transitory storage medium having stored therein instructions that are executable by one or more hardware processors to perform operations comprising the operations of any one or more of embodiments 1-15.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of this disclosure also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality. Combinations of the above should also be included within the scope of computer storage media. Such media are also examples of non-transitory storage media, and non-transitory storage media also embraces cloud-based storage systems and structures, although the scope of this disclosure is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments may be downloadable to one or more systems or devices, for example, from a website, mesh topology, or other source. As well, the scope of this disclosure embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, client, agent, service, engine, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments may be performed in client-server environments, whether network or local environments, or in any other suitable environment. Suitable operating environments for at least some embodiments include cloud computing environments where one or more of a client, server, or other machine may reside and operate in a cloud environment.

Figure 6:
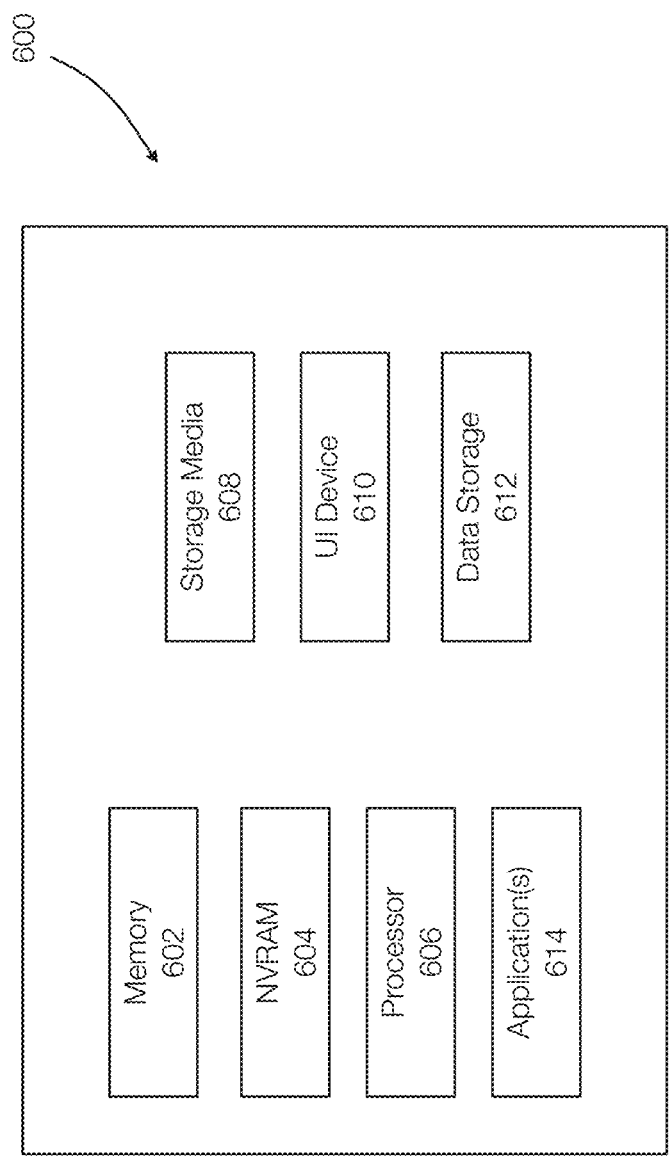
FIG. 6 discloses aspects of a computing device, system, or entity.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

The device 600 may also represent a computing system such as a server or set of servers, an edge based computing system, a cloud-based computing system, or the like. The computing system may be localized or distributed in nature.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The described embodiments are to be considered in all respects only as illustrative and not restrictive. All changes which come within the meaning and range of equivalency of the claims are to be embraced within their scope.

What is claimed is:

1. A method for generating an auxiliary database configured for information retrieval operations, the method comprising:
  accessing an object stored in a repository of objects;
  dividing the object into distinct parts;
  labelling each of the distinct parts as a semantic cell, a metadata cell, or irrelevant such that the distinct parts include semantic cells and metadata cells;
  splitting content of each of the semantic cells into chunks;
  generating chunk embeddings for each of the chunks of each of the semantic cells; and
  generating a knowledge graph that includes a root node representing the repository,
  wherein:
    the object is represented by an object node under the root node,
    the semantic cells and the metadata cells are arranged as semantic nodes and metadata nodes hierarchically under the object node,
    chunk nodes are created for each of the chunks under corresponding semantic nodes, and
    each of the chunk embeddings includes a pointer to a corresponding chunk node in the knowledge graph.

2. The method of claim 1, wherein the object comprises a document and the repository is a data source of documents.

3. The method of claim 1, wherein the knowledge graph includes objects from multiple repositories.

4. The method of claim 1, further comprising formatting and cleaning the content of the semantic cells and of the metadata cells.

5. The method of claim 4, further comprising assigning a type to each of the metadata cells based on the content of the metadata cells and assigning a semantic type from a collection of possible types to each of the metadata cells.

6. The method of claim 1, wherein labelling each of the distinct parts is based on domain expert knowledge.

7. The method of claim 1, further comprising storing the chunk embeddings and associated pointers in a vector database.

8. The method of claim 7, further comprising generating an auxiliary database that includes the vector database and the knowledge graph.

9. The method of claim 8, further comprising performing management operations in the vector database and the knowledge graph when changes occur to objects in the repository, wherein the changes include one or more of object additions, object deletions, or object modifications.

10. A method for retrieving information from an auxiliary database that includes a vector database and a knowledge graph, the method comprising:
  receiving a query from a client, wherein the query includes a semantic type;
  generating a query embedding from the query;
  searching the vector database with the query embedding to identify a k most similar chunk embeddings to the query embedding;
  identifying chunks corresponding to the chunk embeddings and their corresponding nodes in the knowledge graph;
  obtaining semantic cells associated to the identified chunks and an object associated with the semantic cells;
  obtaining metadata cells associated with the object and identifying a set of the metadata cells whose semantic type matches the semantic type included in the query; and
  returning a return object that includes the object, the semantic cells, and the set of metadata cells.

11. The method of claim 10, further comprising formatting the return object as input for content generation.

12. The method of claim 11, further comprising performing content generation using the input.

13. The method of claim 10, further comprising generating the query vector using a large language model that generated the chunk embeddings.

14. The method of claim 10, wherein the return object contextualizes the query.

15. The method of claim 10, wherein the semantic cells are based on domain expert knowledge.

16. A non-transitory storage medium having stored therein instructions that are executable by one or more hardware processors to perform operations comprising:
  accessing an object stored in a repository of objects;
  dividing the object into distinct parts;
  labelling each of the distinct parts as a semantic cell, a metadata cell, or irrelevant such that the distinct parts include semantic cells and metadata cells;
  splitting content of each of the semantic cells into chunks;
  generating chunk embeddings for each of the chunks of each of the semantic cells; and
  generating a knowledge graph that includes a root node representing the repository,
  wherein:
    the object is represented by an object node under the root node, the semantic cells and metadata cells are arranged as semantic nodes and metadata nodes hierarchically under the object node, chunk nodes are created for each of the chunks under corresponding semantic nodes, and each of the chunk embeddings includes a pointer to a corresponding chunk node in the knowledge graph.

17. The non-transitory storage medium of claim 16, wherein the object comprises a document and the repository is a data source of documents, wherein the knowledge graph includes objects from multiple repositories, further comprising:

formatting and cleaning the content of the semantic cells and of the metadata cells; and assigning a type to each of the metadata cells based on the content of the metadata cells and assigning a semantic type from a collection of possible types to each of the metadata cells.

18. The non-transitory storage medium of claim 16, wherein labelling each of the distinct parts is based on domain expert knowledge, further comprising:

storing the chunk embeddings and associated pointers in a vector database; and generating an auxiliary database that includes the vector database and the knowledge graph.

19. The non-transitory storage medium of claim 18, further comprising performing management operations in the vector database and the knowledge graph when changes occur to objects in the repository, wherein the changes include object additions, object deletions, and/or object modifications.

20. The non-transitory storage medium of claim 16, further comprising:

receiving a query from a client, wherein the query includes a semantic type;

generating a query embedding from the query;

searching a vector database with the query embedding to identify a k most similar chunk embeddings to the query embedding;

identifying chunks corresponding to the chunk embeddings and their corresponding nodes in the knowledge graph;

obtaining semantic cells associated to the identified chunks and an object associated with the semantic cells;

obtaining metadata cells associated with the object and identify a set of the metadata cells whose semantic type matches the semantic type included in the query; and returning a return object that includes the object, the semantic cells, and the set of metadata cells.

* * * * *